United States Patent
Yen et al.

(10) Patent No.: US 7,209,887 B2
(45) Date of Patent: Apr. 24, 2007

(54) AUTO ALLOCATION SWAP SYSTEM

(75) Inventors: Wei-Kuo Yen, Hsin-Chu (TW); Jen-Hua Liu, Taipei (TW); Chih-Yi Hsu, Hualien (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 652 days.

(21) Appl. No.: 10/318,536

(22) Filed: Dec. 13, 2002

(65) Prior Publication Data
US 2004/0117266 A1 Jun. 17, 2004

(51) Int. Cl.
G06Q 30/00 (2006.01)
G06Q 10/00 (2006.01)
G06F 19/00 (2006.01)

(52) U.S. Cl. .............................. 705/7; 705/28
(58) Field of Classification Search ............. 700/99, 700/100; 705/7, 28
See application file for complete search history.

(56) References Cited

U.S. PATENT DOCUMENTS

| | | | |
|---|---|---|---|
| 5,546,326 A | 8/1996 | Tai et al. | 702/84 |
| 5,818,716 A | 10/1998 | Chin et al. | 700/100 |
| 5,880,960 A | 3/1999 | Lin et al. | 700/99 |
| 6,088,626 A | 7/2000 | Lilly et al. | 700/100 |
| 6,415,195 B1* | 7/2002 | Gleditsch et al. | 700/99 |
| 6,711,449 B1* | 3/2004 | Miyahara et al. | 700/100 |
| 6,898,472 B2* | 5/2005 | Crampton et al. | 700/97 |
| 7,024,371 B2* | 4/2006 | Ojha et al. | 705/8 |
| 7,058,587 B1* | 6/2006 | Horne | 705/7 |
| 2002/0128913 A1* | 9/2002 | Ower | 705/22 |
| 2002/0161674 A1* | 10/2002 | Scheer | 705/28 |
| 2002/0169695 A1* | 11/2002 | Ko et al. | 705/28 |
| 2003/0065415 A1* | 4/2003 | Hegde et al. | 700/100 |
| 2004/0093286 A1* | 5/2004 | Cooper et al. | 705/28 |

FOREIGN PATENT DOCUMENTS

WO WO-0017795 A1 * 3/2000

OTHER PUBLICATIONS

Anon., "Manugistics Agrees to Acquire ProMIRA Software, Creating First End-to-End Supply Chain Management Solution for Manufacturers of Complex Products," PR Newswire, Feb. 12, 1998.*

(Continued)

*Primary Examiner*—Nicholas D. Rosen
(74) *Attorney, Agent, or Firm*—Haynes and Boone, LLP

(57) ABSTRACT

A new mechanism is provided that allows for changing the status of product in a product ordering an shipment system from products that is allocated to a customer to product that becomes available to potentially another customer. A Capacity Allocation Supported Demand (CASD) file is maintained that contains customer data and therewith, on a per customer basis, product source, a balance of product allocated to the customer and product data. At the time that an order is placed, this file is interrogated to determine if enough product is available for shipment. For instances where this is not the case, a rule based search is performed to locate product that can be allocated. An Available To Promise (ATP) file is instrumental in this search, a successful search is concluded with allocating the product to the customer order and updating the CASD and ATP files.

32 Claims, 5 Drawing Sheets

OTHER PUBLICATIONS

Anon., "BAAN: Baan Company Extends Leadership in Supply Chain Management," M2 Presswire, Nov. 6, 1999.*

Anon., "Onedayfree's Calendar Auction Model Could Become Leading Internet Auction Format, According to University of California Researchers," Business Wire, May 11, 2000.*

Anon., "SAP Adds New Industry-Specific Features with Enhnaced MySAP Supply Chain Management Planning Solution . . . ".*

Doherty, S., "Solaris 9 Does It All," Network Computing, p. 24, Jun. 24, 2002.*

* cited by examiner

FIG. 1 - Prior Art

AUTO ALLOCATION SWAP SYSTEM

BACKGROUND OF THE INVENTION (1) Field of the Invention

The invention relates to the fabrication of integrated circuit devices, and more particularly, to a method for improved order placement and prioritizing.

(2) Description of the Prior Art

For the creation and delivery of semiconductor devices, technical capabilities of device creation must be supported by and be complementary to capabilities of device ordering and device shipment. In both of these disciplines there potentially exists a wide margin of error that can as a first for instance result in poor device quality and as a second for instance in non-optimized shipment of devices.

System requirements of a system that supports shipment of semiconductor devices must meet customer expectations of quick response time and of maintaining precise and up-to-date delivery schedules of product that is shipped to a variety of customers. These latter requirements must be integrated in a smooth manner with production capabilities and production schedules, any mismatch between product that is required and product that is being manufactured is likely to result in customer dissatisfaction. The manufacturing operations must thereby be performed in a cost-effective manner, which in most cases requires an optimum usage of manufacturing equipment, an optimum product mix and optimized equipment maintenance.

In many ways therefore can it be stated that an ordering system drives a manufacturing facility, product is committed to numerous customers on a long term and short term basis while the ordering system must be capable of quick response and updating of any input that changes existing delivery schedules and commitments, based on customer requirements.

The product ordering system must thereby function and be designed for a manufacturing facility that is complex and multi-faceted and may comprise such manufacturing aspects as handling one-time, specific orders, providing special products that are not part of conventional processing cycles, simultaneously providing products of different type, recycling product and the like. From all of this it is clear that a system that is required to handle customer orders must be all-inclusive and must yet remain flexible so that existing conditions of customer orders can be changed with short term notice.

In a conventional customer ordering system, a Central Planning Department (CPD) controls and supervises system content and operation and maintains data that reflect, on a per-customer basis, product that is allocated to customers and product that has been ordered by the customers, this in a file that for this purpose is typically referred to as a Customer Allocation Support and Demand (CASD) function. This conventional function suffers the disadvantage that an order, when placed, cannot be instantaneously placed but is only entered and activated at the time that a Total Order Management (TOM) batch run is executed. A TOM batch run is conventionally scheduled at about eight hour intervals, in view of the requirements that are placed on the TOM execution.

To enhance system turn-around for customer orders, it is of benefit to improve this method, whereby a customer order when placed can be directly and without time-delay entered into the system, that is entered into the conventional CASD. The invention provides such a function.

U.S. Pat. No. 5,880,960 (Lin et al.) shows a WIP balance and scheduling system.

U.S. Pat. No. 5,818,716 (Chin et al.) shows a dynamic lot dispatching system.

U.S. Pat. No. 5,546,326 (Tai et al.) shows another dynamic lot Dispatching system.

U.S. Pat. No. 6,088,626 (Lilly et al.) teaches a scheduling method.

SUMMARY OF THE INVENTION

A principal objective of the invention is to provide a rule-based mechanism for automatically swapping allocated product with product that can be committed to a customer.

In accordance with the objectives of the invention a new mechanism is provided that allows for changing the status of product in a product ordering an shipment system from products that is allocated to a customer to product that becomes available to potentially another customer. A Capacity Allocation Supported Demand (CASD) file is maintained that contains customer data and therewith, on a per customer basis, product source, a balance of product allocated to the customer and product data. At the time that an order is placed, this file is interrogated to determine if enough product is available for shipment. For instances where this is not the case, a rule-based search is performed to locate product that can be allocated. An Available To Promise (ATP) file is instrumental in this search, a successful search is concluded with allocating the product to the customer order and updating the CASD and ATP files.

DESCRIPTION OF THE PREFERRED EMBODIMENTS

Figure 1:
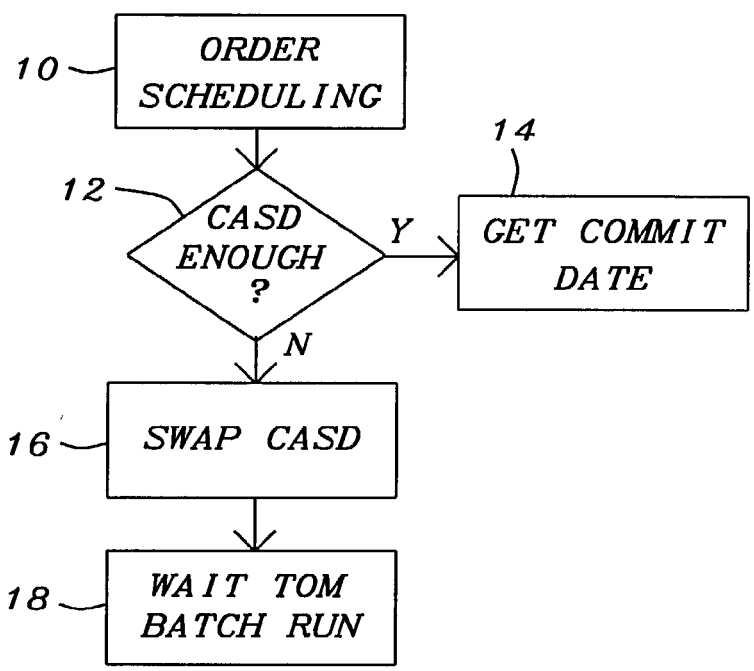
FIG. 1 shows a flowchart of a prior art order-processing scheme.

The basic concept on which the invention is based is that a semiconductor manufacturing facility sells or commits wafer capacity to customers. The customers forecast their demand in advance, that is the customers provide the expected product need to the manufacturing facility. The Capacity Allocation Support and Demand (CASD) function maintains a record of the manufacturing capability that is committed to a customer.

Conventional record format of the CASD function is first highlighted. This will be done by highlighting the records or entries that are maintained by the CASD function without thereby providing detail about record length (the number of bytes per record) or record implementation or methods of storing or accessing the records. These performance and implementation parameters are not germane to the invention.

The CASD record contains the following entries:

AREA, for instance A00, that is the geographic location of the customer, which may be a country, a location within a country, etc.

Customer, customer identification, for instance A398, which identifies a customer within a given geographic location Fab, the fabrication facility within the manufacturing facility to which the CASD record relates, for instance 41

Allo Month, a time entrance, such as 200108, which indicates the calendar month for which the product within this CASD record is allocated to the customer of this CASD record; for instance product "X" is allocated to customer "Y" for the month of "Z"

Balance, a balance entry, for instance 400, which indicates the number of wafers that the facility owes or has committed to this customer, the Balance therefore equals the number of wafers promised (to the customer) minus the number of wafer shipped, this within the month of allocation (Allo Month)

MICR, the technology of the product that has been allocated to this customer for the Allo Month, for instance 0.13 µm, 0.18 µm, etc.

FUNC, the functional group of the product that has been allocated to the customer for the Allo Month, for instance logic chip, memory chip, etc., noted as for instance LL01

METL, the number of layers of metal that must be applied to the product that is allocated to the customer for the Allo Month, for instance 7

POLY, the number of polysilicon layers that must be applied for the product that is allocated to the customer for the Allo Month, for instance 1

LINE, the type of order that is pending for this customer, for instance F (Full) indicating that the wafers are to be delivered when completed, B (Bank) indicating that the wafers are to be stored or banked to the point in time where the customer indicates a need for the wafers BUSI, the type of business in which the customer is engaged, entered as for instance C WAFE, the unit if measure of the order, that is the customer order is for wafers or for packages of for die TEST, is testing required prior to delivery of the order, entered as Y (yes) or N (no), and CSTN, the dimension of the mask that is applied for the creation of the product, for instance a 5X mask.

The above highlighted record is maintained by the CASD function and, as previously indicated, reflects the allocation of the manufacturing capability to a customer. The CASD record is typically and significantly a six-month forecast. The CASD record is, from an operational point of view, a planning record.

The CASD record is balanced against the Order record, the Order record reflecting an actual detailed order submitted to the manufacturing facility by the customer.

All data entry records that have been highlighted above for the CASD record are maintained for the Order record with the exception of the Balance record which, in the Order record, is a Request entry indicating the actual quantity of product that is requested at the instant that the Order is submitted by the customer to the manufacturing facility.

The indicated similarity in record layout between the CASD record and the Order record does not imply that the entries in both fields are the same, these entries are in fact expected to be at variance since the CASD record represents a (best can do) function while the Order record represents an actual situation of the customer order.

The CASD record and the Order record may vary in a number of entries, such as the MICR (technology), the METL (layers of metal required), TEST (to test or not to test prior to shipment) while it is basically to be expected that the number of Requested units may vary with the number of the Balance of the units that are committed to the customer. For any of these variations an action is taken by the invention that allows for direct updating of the customer order.

The conventional method of processing an order will first be summarized using FIG. 1, wherein have been highlighted:

step 10, incoming orders are processed the CASD record of the customer is accessed 12, if the CASD has a favorable Balance, that is the Request quantity in the Order record is equal to or less than the Balance quantity in the CASD record, product is available for this customer so that the product can be shipped to the customer 14, commit the product to the customer by establishing a commit date to the customer for the product 16, if the Balance is not adequate for this customer, the product is allocated by reprioritizing the product that is contained in the CASD records and by swapping (re-assigning) product from one (or more) customer(s) to the order and customer that is being analyzed, and 18, after the CASD records have been swapped and the order for the customer has been satisfied, a Total Order Management (TOM) batch run is invoked; it must thereby be remembered that the TOM batch run is only periodically performed, incurring a delay in the processing of the customer order.

The TOM batch run function 18 provides a commit date by the manufacturing facility to the customer. The Order function represents daily orders received from one or more customers, the swap CASD function 16 is a manual operation that is conventionally performed by Customer Service (CS) personnel and is not implied to be an automatic, computer controlled function.

Figure 2:
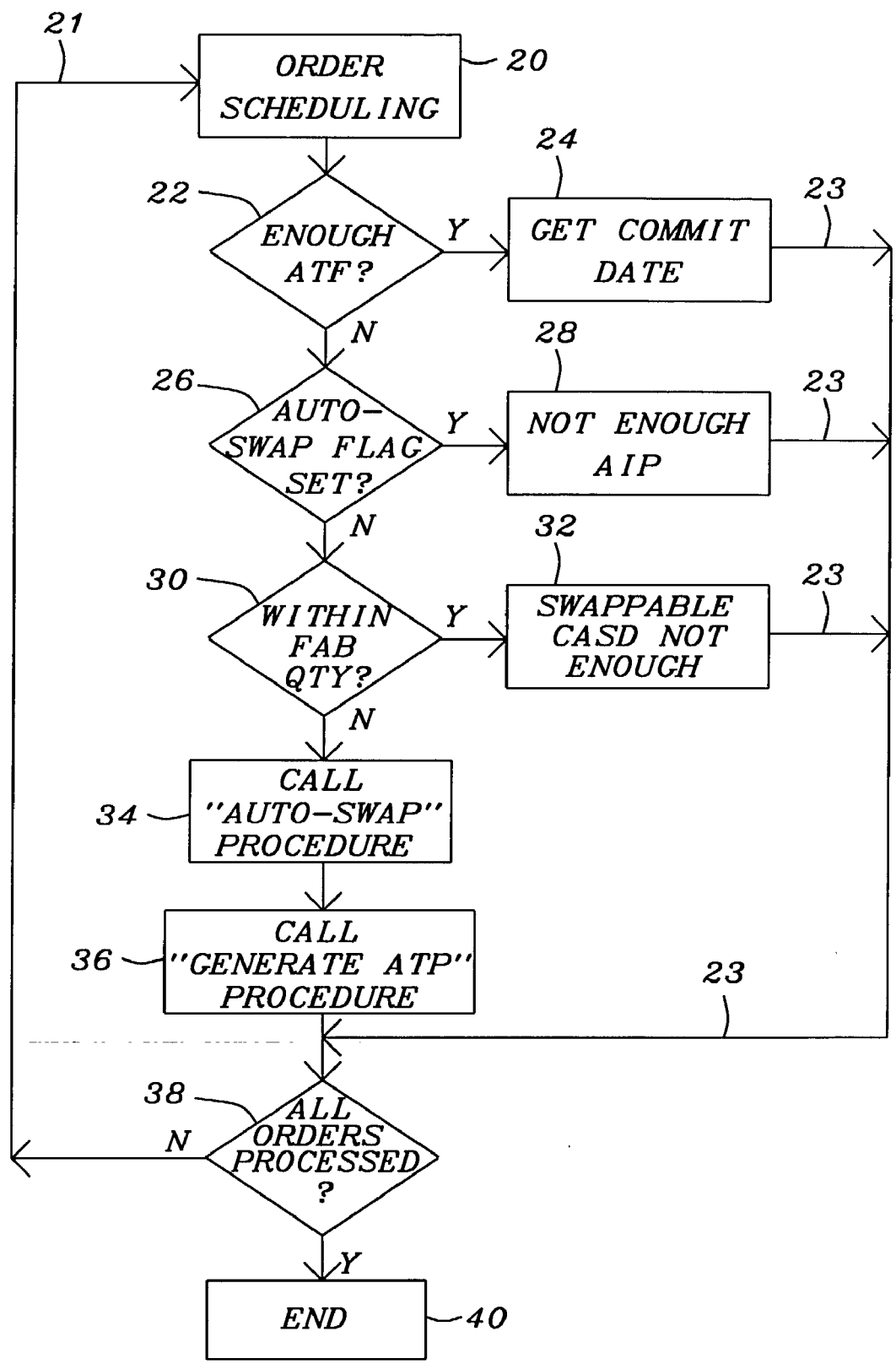
FIG. 2 shows a flowchart of the order-processing scheme of the invention.

The flow of the new method of processing orders, as provided by the instant invention, is now highlighted using FIG. 2.

The flow that is shown in FIG. 2 first determines relevant conditions of the order prior to invoking the central functions 34, the Auto-Swap procedure, and 36, the Generate ATP procedure.

The flow that is shown in FIG. 2 is initiated by the Order Scheduling function 20, which can be invoked by the controlling software such as a supervisory function running on an order processing computer. The orders, submitted on a daily basis are sequentially processed by function 20.

For a given order, first is determined if the Available To Promise (ATP) product, which is equal to the Balance minus the sum of previous Requests, is adequate to fill the order. If this is the case, the order can be filled and a commitment date can be created, function 24, FIG. 2. Processing continues via branch 23 from function 24 of, if available, additional orders.

If ATP is not adequate to fill the order, function 26 interrogates to determine if the Auto-Swap function is enabled by the setting of the Auto-Swap flag. The Auto-Swap flag is manually set or controlled by a Central Planning Department (CPD).

If the Auto-Swap flag is not set, block 28, a message is printed that indicates that there is not Adequate Inventory of the Product (AIP) after which processing continues via branch 23 from function 28 of, if available, additional orders.

If the Auto-Swap flag is set, it is determined, function 30, if the swappable CASD does not exceed a limit for the manufacturing facility, that is: is the requested quantity of the order within the limit that is allowed to be processed by the Auto-Swap system. This limit is manually maintained by the Customer Service (CS) organization to assure that an upper limit is in place on product that can be processed and potentially committed to a customer. This prevents open-ended processing by the flow that is shown in FIG. 2. For instance, an order in excess of 1,000 wafers can in this manner still be manually processed by showing the message created by function 32, a message that states that the swappable product contained in the CASD file is not enough and that therefore consideration must be given to additional manufacturing resources being dedicated to meet the order. This (presumably) large order may be an unusual order for the manufacturing facility and may therefore required special consideration by the CS organization.

For orders that are not within the manufacturing quantity that is desired or allowed to be analyzed for automatic re-assignment of previously committed product to the current order, a message is printed by function 32 to that effect after which processing continues via branch 23 from function 32 for the processing, if required, of additional orders.

For orders where the requested quantity is within the permitted or desired FAB quantity, the order can now be further processed and filled using the functions 34, the Auto-Swap function, and 36, the Generate ATP function, of the invention. These two functions are further highlighted in detail below, the explanation of these functions will be temporarily postponed at this time so that the remaining functions shown in FIG. 2 can be explained first.

After functions 34 and 36 have been executed, the flow of FIG. 2 shows that processing continues if more orders need to be processed. Function 38 determines whether all orders have been processed, is so the Order Scheduling flow of FIG. 2 will terminate with a return 40 to the supervisory function. Additional orders are processed, via branch 21 from function 38 by effectively re-entering the Order Scheduling function 20.

During and as part of the subject explanation it is of value to keep in mind that the method of the invention allows many variances in the placed orders to be accepted and processed, this without incurring a delay for the scheduling of a batch processing run, while at the same time flagging large variances in the placed orders for special attention by Customer Service (CS)) personnel. Conventionally, swapping of CASD content was a manual and therefore time-consuming effort, having a negative impact on the cost performance of the ordering system.

It must further be considered that, as a practical consideration, if a large number of quantities of product are automatically swapped, the effectiveness of forward planning is negatively affected and looses its usefulness. It is therefore from an overall manufacturing point of view advantageous to have the auto-swap function that is invoked only for un-conventional orders and not as a rule.

Figure 3:
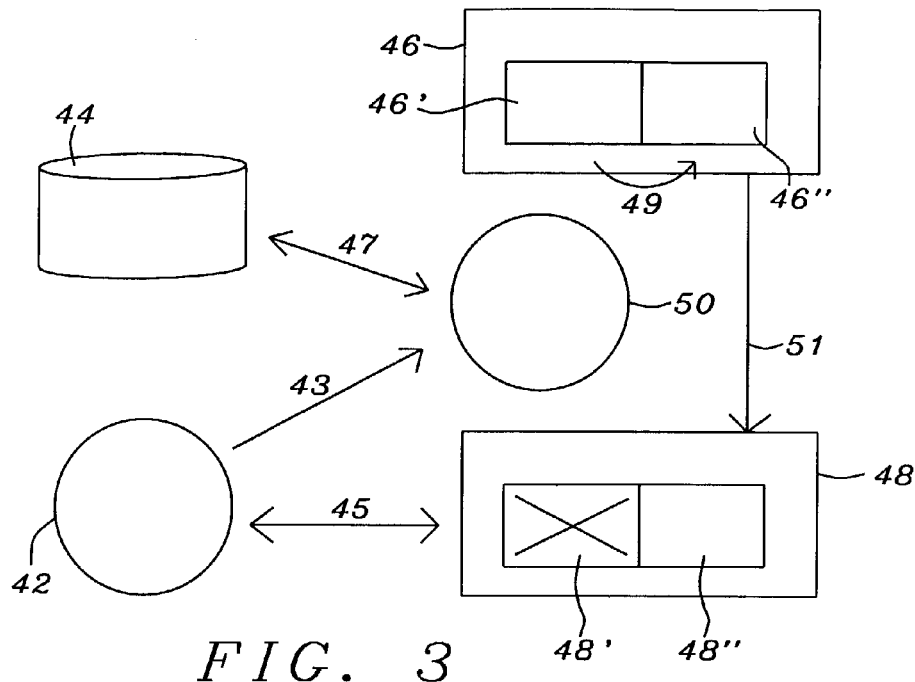
FIG. 3 shows a high-level flowchart of the interaction of system components of the order-processing scheme of the invention.

The functional and organizational aspects of the flow of the invention is further highlighted using FIG. 3, wherein is shown the overall system architecture of the Auto Allocation Swap (AAS) system of the invention. The main components of the AAS system are:
42, the Order Scheduling function
44, the Brokering Rule Data base
46, the CASD records
48, the ATP records and
50, the CASD broker.

The Order Scheduling function 42 places via interface 43 a Request or order, the CASD Broker function 50 interfaces via interface 47 with the Brokering Rule function 44. This may result in swapping 49 of CASD Record 46' to record 46" in the CASD record pool 46. CASD record 46' is an existing schedule while CASD record 46" is a proposed swap value, the new swap having been caused by one or more variances in the placed order. From this action follows, interface 51, the generation of new ATP values by deleting ATP record 43' and creating a new ATP record 48" in its place as part of the ATP record pool 48. The Order Pool 42 and the ATP record pool 48 interface via interface 45.

The Brokering Rule database 44 contains a set of pre-defined and configurable rules that are applied in a brokering capacity. The function of the Brokering Rule 44 is to place constraint on the flow of FIG. 2, for instance the number of variances that a wafer may accept. As a second for instance can be cited that some critical technologies may have a smaller variance allowed. Priorities may also be implemented by the Brokering Rule function 44, for instance to find similar CASD profiles and to assign priority in swapping these similar CASD profiles in order to reduce the frequency or impact of swapping activities.

A number of auto swap constraints are in force that can be divided into hard constraints and soft constraints.

As hard constraints can be cited:
area code
customer family code that is maintained by a Regional Sales Office (RSO) and reflects a Customer Established Hierarchy
the FAB code, and
the allocation by year and by month.

As soft constraints can be cited:
the total swapped CASD in a single month for each transaction cannot exceed the FAB quota, and
the Central Planning Department (CPD) can manually maintain the quote by FAB.

For the cited hard constraints the following can be enforced:
open-sided can be treated as the same customer family, the validity of the open-side aspect is determined by the open-side flag, and
the open-side flag is maintained by the Regional Sales Office and is determined on the basis of "AREA", "Month" and "FAB".

The flowchart of FIG. 2 and the therewith provided explanation has shown that initial steps 22, 26 and 30 of interrogation must all be passed before steps 34, the call "Auto-Swap" procedure and step 36, the Generate ATP procedure, are reached. These latter two procedures are now explained.

As a summary statement can it be said that function 34, the Auto-Swap procedure, is invoked to automatically swap the CASD plan values while function 36, the Generate ATP function provides an updated set of ATP values wafer a swap has been completed.

The "Auto Swap" procedure provides for assigning product that has previously been allocated to a customer to a new order. In the format of the CASD file that has previously been highlighted, the data contained therein can functionally be divided into:
customer data, such as AREA, Customer
a source of product, that is where within the manufacturing facility is the product made, such as Fab product that is allocated to the customer, that is the Balance entry a time stamp which is the month for which the product is allocated to the customer, that is Allo Month product description, such as MIRC, FUNC, METL, etc., and Product-processing steps required prior to shipment of the product to the customer, such as TEST and CSTN.

This data can be analyzed for a determination whether some or this entire product can beneficially be re-allocated to a new customer, which is the customer that has now placed an order for product. For this to be the case it is obvious that product that is re-allocated must meet the new customer order, not only in the sense of product availability (whereby the product is transferred from a commitment to another commitment created by the new order) but also from the point of view of product technical characteristics. Some product can be "upgraded" in the sense that 0.6 μm product can be used to fill an order for 0.25 μm product. Some product is preferably not used to fill a new customer order since this product may be more expensive the produce, for instance 0.18 μm may be used to replace 0.25 μm product for a new customer order but only if no other alternative is available for filling the order. The previously highlighted constraints play a role in this process of product swapping.

Figure 4:
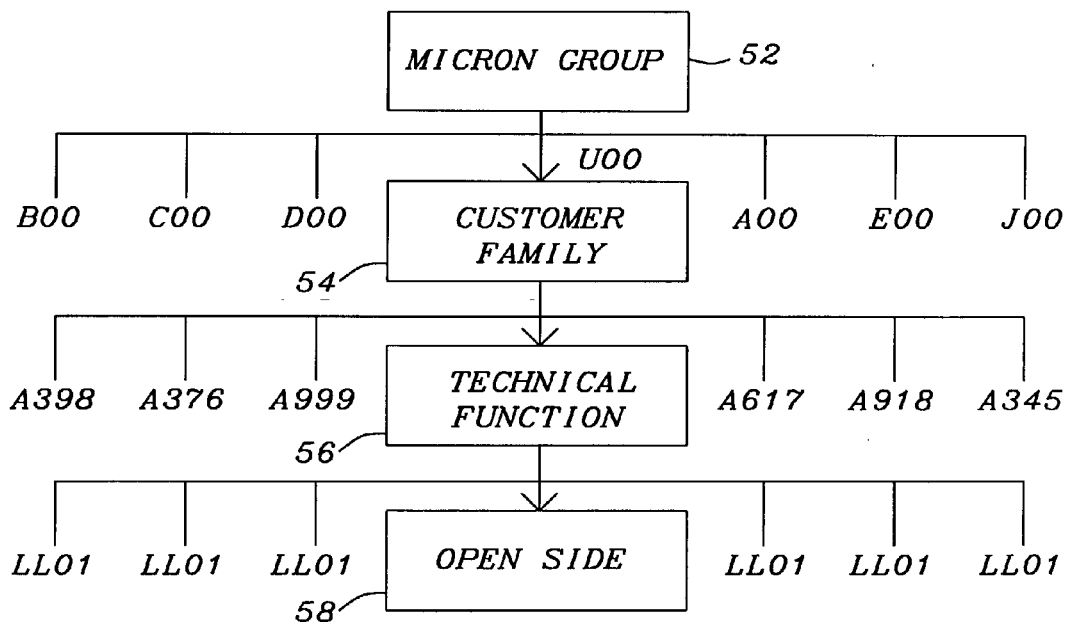
FIG. 4 shows tree-chart of a hierarchical product structure that is used by the invention.

To enable the process of product swapping, the product is divided in an ascending search tree, using the following hierarchy in increasing order of detail, see FIG. 4:

a micron group 52, which contains a pointer to customer families customer family 54, which groups customers that typically have the same product requirements a technical function 56 group, which groups product of the same or of interchangeably technical characteristics, and an open side 58.

The latter parameter, the open side 58, refers to a buffer area on a wafer, which contains product that has not previously been allocated to any customer. It is clear that, as a last resort, the open side can be analyzed if no interchangeable product has been found in the customer family but this only in the open side for that customer family.

In the hierarchical flow chart of FIG. 4, a number of parameters have been highlighted as examples and as indicators of the sub-divisions that are valid following each of the levels of the hierarchy.

Figure 5:
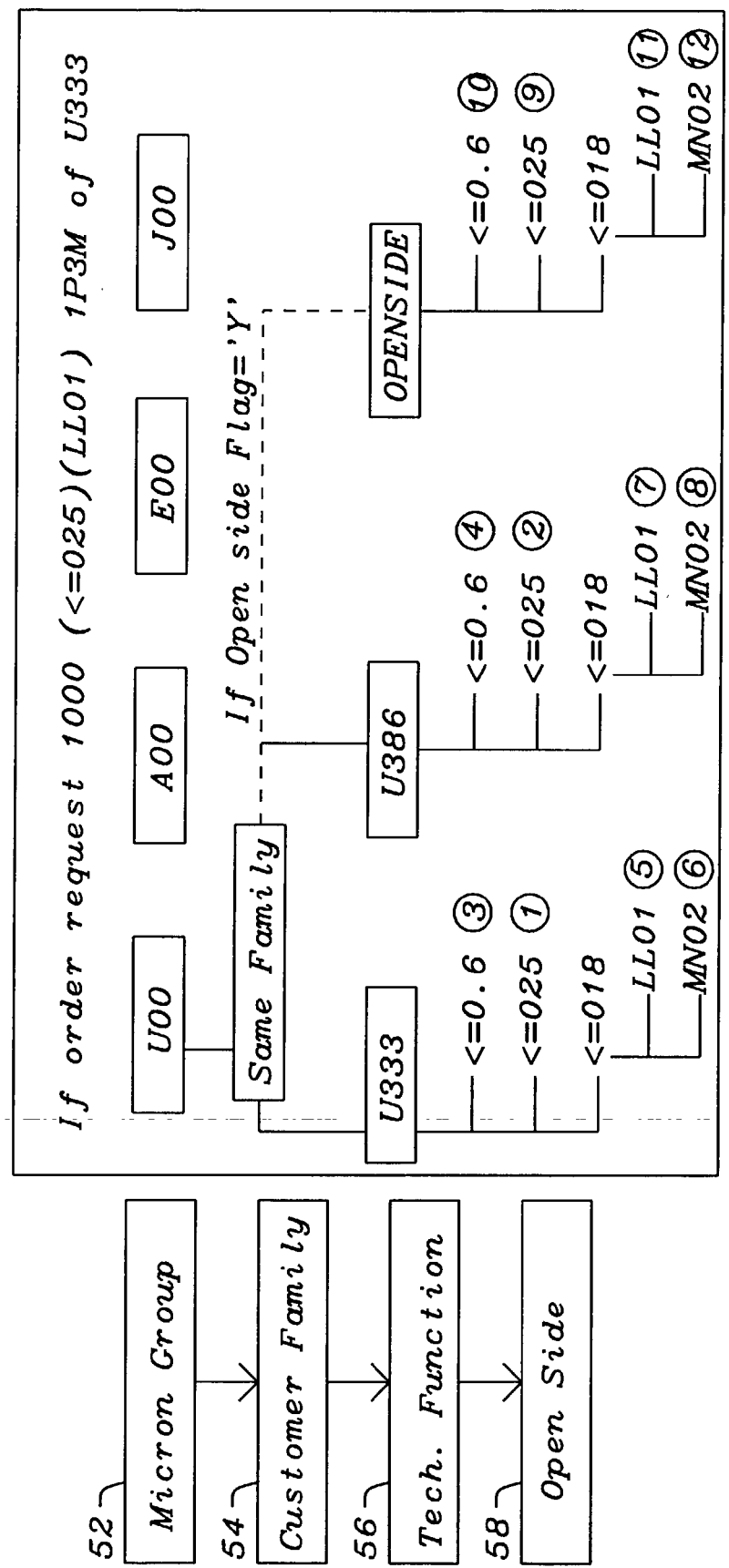
FIG. 5 provides details of search priorities that are used by the invention.

The Auto Swap routine can now be further explained using FIG. 5 where the previously highlighted hierarchy 52, 54, 56 and 58 has been indicated in the left-hand section of FIG. 5 while further and there-with related detail is provided in the balance of FIG. 5.

The search sequence has been highlighted with numbers 1–12 that have been circled. The order for which the search is performed has been listed in the upper section of FIG. 5, as follows:

1000(<=25)(LL01)1P3M of U333, the various fields in the order entry are:

1000, the number of wafers that have been ordered (<=25), the technology, MIRC in the previously highlighted record format of the CASD record, in this case 0.25 μm technology (LL01), the number of Logic Layers that must be provided on the wafers 1P3M, one layer of polysilicon and three layers of metal are required for the product U333, the customer or family number, also as previously highlighted in the CASD record format.

The search for replaceable product is then as follows, all following numbers referring to the circled numbers shown in FIG. 5:

1, for this customer is there an adequate supply of the desired product allocated to this customer 2, if the product that has been allocated to customer U333 is not enough to fill this order, identical product is searched for within the same Customer Family 3, if no identical product can be allocated within the same Customer Family, product interchange (down-grading) is attempted whereby product that has been allocated within the Customer Family and that meets the technical requirements of the order that is being analyzed is used to fill the order 4, as "3" above but now within other customers in the Customer Family 5 through 8, the search can be extended, in this case to product which preferably would not be used to fill the order, first within the same Family (5 and 6), then in another Customer within the same Customer Family (7 and 8)

9 through 12, if as yet no product has been allocated that can be used to fill the order, the Open Side of the wafer is analyzed, first for exact matching product (9), than for relaxed product (10), then for less desirable (expensive) but as yet usable product (11 and 12).

In the above indicated searches, the Available To Promise (ATP) record plays the role whereby steps that search for replacement product, such as steps other than steps 1, 2 and 9–12, access the ATP record for the indicated analysis since these steps search for product that has previously been promised to (another) customer.

Failure of the Auto Swap routine, FIG. 5, to allocate any product for assignment to the order will result in a message being printed to that effect after which a next order is processed. This message, not shown in the flowchart of FIG. 2, will be initiated by unit 34 of flowchart FIG. 2.

Figure 6:
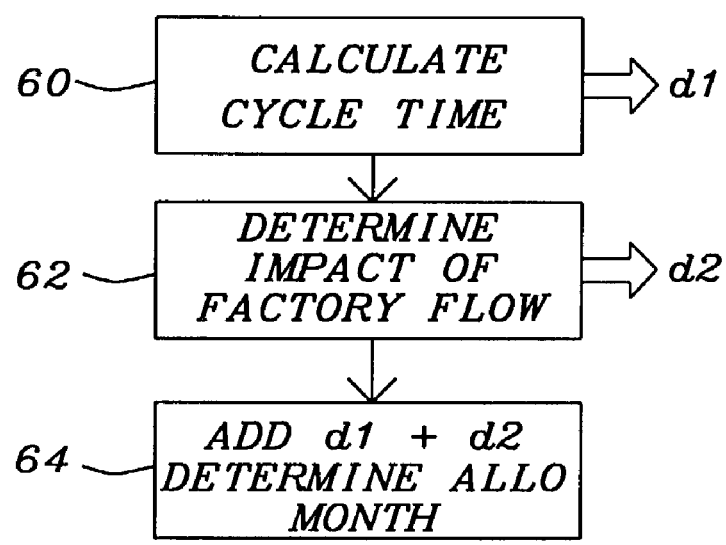
FIG. 6 shows processing steps of FIG. 5 comprising a three-step procedure.

Success of the Auto Swap routine, FIG. 5, in allocating product for assignment to the order requires processing steps of determining a commitment date for the allocated product, the Available To Promise record is updated with this commitment date. These processing steps comprise a three-step procedure as shown in FIG. 6.

The first of these three steps, step 60, FIG. 6, the determining of a cycle time will be discussed first. The product cycle time, from which a potential commitment date "$d_1$" is determined, is determined by taking the current date, adding to this date the product cycle time (in days) and further adding (a number of days) for post fabrication activities such as shipping, product transfer and the like.

The second step, step 62, FIG. 6, evaluates the impact in days "$d_2$" that current and projected product flow have on the calculate cycle time by assigning a weighted value in days to factory activities, for instance as follows:

product dependent activities, Logic Product being assigned a value of 7 days, memory product being assigned a value of 10 days assembly activities, assigned a value of for instance 7 days final test activities, for instance assigned a value of 5 days transfer activities, for instance assigned a value of 1 day shipping activities, for instance assigned a value of 1 day.

The first step provided a date "$d_1$", extending from the current date due to processing activities. The second step took into account impact of product, assembly and special activities such as testing, the days "$d_2$" calculate under the second step are added to the date "$d_1$" calculated under the first step. The latter date, the addition "$d_1$"+"$d_2$" of the results of step 1 and step 2, is referred to as the step 2 result date.

Product allocation is performed on a year-month basis, that is a month within a given year, the Allo Month field in the previously highlighted CASD record.

The third step of the three-step procedure, step 64, FIG. 6, implements the following rules. If the resulting date "$d_1$" that is obtained in step 1 above provides a date which is less than the date of the Allo Month entry for the product in the CASD record, this indicates that the order has been placed early with respect to the CASD monthly delivery schedule for the customer and that is therefore acceptable to assign a committed date of the 15$^{th}$ of the month in which the order is being analyzed, formally:

If step 1 result date<allocation year month
     then committed date=the 15$^{th}$ of
       allocation year month else committed date=step 2 result date.

As an example: if the calculated date obtained by adding the date of step 1 to the days of steps 2 equals May 15 as a potential delivery date but the CASD Allo Month record allows a July date for the product under investigation, then the delivery date is adjusted to July 15.

The invention as highlighted above provides for:
1. embedded intelligence by means of a Rule Base
2. the implementation of a middle-role or broker to swap CASD records, and
3. the implementation of a "top-down" approach to generate a real time Available To Promise (ATP) record.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A method for the automatic allocation of product orders, comprising:
   (1) providing at least one Capacity Allocated (CA) record, comprising:
      (i) customer data;
      (ii) a quantity of product allocated to the customer for a given year month; and
      (iii) CA product description, including a source of creation of the product, further including product processing steps required prior to shipment of the product;
   (2) providing at least one Available To Promise (ATP) record, comprising:
      (i) a quantity of product available for commitment to a customer; and
      (ii) ATP product description, including a source of creation of the product, further including product processing steps required prior to shipment of the product;
   (3) providing at least one Customer Order (CO), comprising:
      (i) customer data;
      (ii) a quantity of product requested by the customer; and (iii) CO product description;
   (4) performing a rules driven search of the ATP record, selecting therefrom product meeting the quantity of product requested by the customer by selecting from the ATP record an ATP product description that at least meets CO product description requirements;
   (5) establishing a commitment date for the quantity of product requested by the customer; and
   (6) updating the at least one ATP record based on the quantity of product requested by the customer, deducting the quantity of product requested by the customer from the quantity of product available for commitment to a customer.

2. A method for automatic allocation of product orders, comprising:
   (1) initiating an Order Scheduling function by a supervisory function;
   (2) determining validity of invoking an Auto-Swap procedure and a Generate ATP procedure, by:
      (i) if a product order can be filled using available product, setting a date Allo Month for shipment of product and continue with initiating the Order Scheduling function;
      (ii) if a product order cannot be filled using available product, determining if the Auto-Swap function is enabled by setting of an Auto-Swap flag:
      (iii) if the Auto-Swap flag is not set, printing a message indicating that there is not Adequate Inventory of the Product (AIP) and continue with initiating the Order Scheduling function;
      (iv) determining, if the Auto-Swap flag is set, whether swappable product does not exceed a limit for a FAB manufacturing facility;
      (v) for orders where the requested quantity is not within the FAB quantity, printing a message to that effect after which processing continues with initiating the Order Scheduling function;
      (vi) for orders where the requested quantity is within the FAB quantity:
         (a) invoking the Auto-Swap function; then
         (b) invoking the Generate ATP function;
   (3) determining whether all orders have been processed:
   (4) if not all orders have been processed, continuing with initiating the Order Scheduling function;
   (5) if all orders have been processed, terminating processing with a return to the supervisory function.

3. The method of claim 2, the Auto-Swap flag being manually set and controlled by a Central Planning Department (CPD).

4. The method of claim 2, wherein the limit is manually maintained by a Customer Service (CS) organization, assuring that an upper limit is in place on product that can be processed and potentially committed to a customer.

5. The method of claim 2, the Auto-Swap function being based on dividing product into a ascending search tree, comprising:
   a micron group, containing a pointer to customer families;
   customer family, grouping customers that typically have same product requirements;
   a technical function group, grouping product having identical or interchangeably technical characteristics; and
   an open side.

6. The method of claim 5, the open side referring to a buffer area on a wafer containing product not having previously been allocated to a customer.

7. The method of claim 2, the Auto-Swap unction comprising a search sequence of:
   a number of product items being ordered;
   a technology of product being ordered;
   a number of Logic Layers being provided on wafers;

layers of polysilicon required for the product;
layers of metal required for the product;
a customer or family number.

8. The method of claim 2, the Auto-Swap function comprising:
determining whether, for a customer, an adequate supply of desired product has been allocated to this customer;
if the product having been allocated to a customer is not adequate for filling an order, searching for identical product within a same Customer Family;
if no identical product can be allocated within the same Customer Family, attempting produce, interchange, whereby product having been allocated within the Customer Family and meeting technical requirements of the order being analyzed is used to fill the order;
if product interchange within a Customer Family is not successful, attempting product interchange, whereby product having been allocated within another Customer Family and meeting technical requirements of the order being analyzed is used to fill the order;
extending searching to additional product, first within the same Customer Family, and proceeding with additional Customers within a Customer Family;
proceeding with analyzing an Open Side of the wafer.

9. The method of claim 8, the Auto-Swap function comprising accessing Available To Promise (ATP) record, searching for product having previously been promised to a customer.

10. The method of claim 8, failure of the Auto Swap routine in allocating product for assignment to an order resulting in a message being printed to that effect after which a next order is processed.

11. The method of claim 8, success of the Auto Swap routine in allocating product for assignment to an order being followed by determining a commitment date for the allocated product, the Available To Promise record being updated with this commitment date.

12. The method of claim 11, the determining a commitment date comprising a first step providing step 1 result, a second step providing step 2 result and a third step providing a committed date.

13. The method of claim 12, the first step comprising determining of a cycle time by taking a current date, adding to this date a product cycle time and further adding a number of days for post fabrication activities.

14. The method of claim 12, the second step comprising evaluating impact in days that current and protected product flow have on a calculate cycle time by assigning a weighted value in days to factory activities, this impact in days being added to the step 1 result to create the step 2 result.

15. The method of claim 14, the weighted values comprising:
product dependent activities, Logic Product being assigned value of 7 days, memory
product being assigned a value of 10 days;
assembly activities, being assigned a value of 7 days;
final test activities, being assigned a value of 5 days;
transfer activities, being assigned a value of 1 day; and
shipping activities, being assigned a value of 1 day.

16. The method of claim 12, the third step comprising implementing:
if step 1 result date<Allo Month
then committed date=the 15th of Allo Month
else committed date=step 2 result date.

17. A system for automatic allocation of product orders, comprising:

(1) at least one Capacity Allocated (CA) record, comprising:
    (i) customer data;
    (ii) a quantity of product allocated to the customer for a given year month; and
    (iii) CA product description, including a source of creation of the product, further including product processing steps required prior to shipment of the product;
(2) at least one Available To Promise (ATP) record, comprising:
    (i) a quantity of product available for commitment to a customer; and
    (ii) ATP product description, including a source of creation of the product, further including product processing steps required prior to shipment of the product;
(3) at least one Customer Order (CO), comprising:
    (i) customer data;
    (ii) a quantity of product requested by the customer; and
    (iii) CO product description;
(4) a rules driven search performed of the ATP record, selecting therefrom product meeting the quantity of product requested by the customer by selecting from the ATP record an ATP product description that at least meets CO product description requirements;
(5) a commitment date established for the quantity of product requested by the customer; and
(6) the at least one ATP record having been updated based on the quantity of product requested by the customer, deducting the quantity of product requested by the customer from the quantity of product available for commitment to a customer.

18. A system for automatic allocation of product orders, comprising:
(1) means for initiating an Order scheduling function by a supervisory function;
(2) means for determining validity of invoking an Auto-Swap procedure and a Generate ATP procedure, by:
    (i) if a product order can be filled using available setting a date Allo Month for shipment of product and means for continuing with initiating the Order Scheduling function; product,
    (ii) if a product order cannot be filled using available product, means for determining if the Auto-Swap function is enabled by setting of an Auto-Swap flag:
    (iii) if the Auto-Swap flag is not set, means for printing a message indicating that there is not Adequate Inventory of the Product (AIP) and continue with initiating the Order Scheduling function;
    (iv) means for determining, if the Auto-Swap flag is set, whether swappable product does not exceed a limit for a FAB manufacturing facility;
    (v) for orders where the requested quantity is not within the FAB quantity, means for a message being printed to that effect after which processing continues with initiating the Order Scheduling function;
    (vi) for orders where the requested quantity is within the FAB quantity:
        (a) means for invoking the Auto-Swam function; then
        (b) means for invoking the Generate ATP function;
(3) means for determining whether all orders have been processed:
(4) if not all orders have been processed, means for continuing with initiating the Order Scheduling function;

(5) if all orders have been processed, means for terminating processing with a return to the supervisory function.

19. The system of claim 18, the Auto-Swap flag being manually set and controlled by a Central Planning Department (CPD).

20. The system of claim 18, the limit being manually maintained by a Customer Service (CS) organization, assuring an upper limit being in place on product that can be processed and potentially committed to a customer.

21. The system of claim 18, the Auto-Swap function being based on dividing product into a ascending search tree, comprising:
   a micron group, containing a pointer to customer families;
   customer family, grouping customers that typically have same product requirements;
   a technical function group, grouping product having interchangeably technical characteristics; and
   an open side.

22. The system of claim 21, the open side referring to a buffer area on a wafer containing product not having previously been allocated to a customer.

23. The system of claim 18, the Auto-Swap function comprising means of performing a search sequence, the search sequence comprising:
   a number of product items being ordered;
   a technology of product being ordered;
   a number of Logic Layers being provided on wafers;
   layers of polysilicon required for the product;
   layers of metal required for the product;
   a customer or family number.

24. The system of claim 18, the Auto-Swap function comprising:
   means of determining whether, for a customer, an adequate supply of a desired product has been allocated to this customer
   if the product having been allocated to a customer is not adequate for filling an order, means of searching for identical product within a same Customer Family;
   if no identical product can be allocated within the same Customer Family, means of attempting product interchange, whereby product having been allocated within the Customer Family and meeting technical requirements of the order being analyzed is used to fill the order;
   if product interchange within a Customer Family is not successful, means of attempting product interchange, whereby product having been allocated within another Customer Family and meeting technical requirements of the order being analyzed is used to fill the order;
   means of extending searching to additional product, first within the same Customer Family, and proceeding with additional Customers within a Customer Family;
   means of proceeding with analyzing an Open Side of the wafer.

25. The system of claim 24, the Auto-Swap function comprising means of accessing Available To Promise (ATP) record, means of searching for product having previously been promised to a customer.

26. The system of claim 24, failure of the Auto Swap routine in allocating product for assignment to an order resulting in a message being printed to that effect after which a next order is processed.

27. The system of claim 24, success of the Auto Swap routine in allocating product for assignment to an order being followed by means of determining a commitment date for the allocated product, means of updating the Available to Promise record with this commitment date.

28. The system of claim 27, the means of determining a commitment date comprising means of determining a first step providing step 1 result, means of determining a second step providing step 2 result and means of determining a third step providing a committed date.

29. The system of claim 28, the means of determining a first step comprising means of determining of a cycle time by taking a current date, adding to this date a product cycle time and further adding a number of days for post fabrication activities.

30. The system of claim 28, the means of determining second step comprising means of evaluating impact in days that current and projected product flow have on a calculate cycle time by assigning a weighted value in days to factory activities, this impact in days being added to the step 1 result to create the step 2 result.

31. The system of claim 30, the weighted values comprising:
   product dependent activities, Logic Product being assigned a value of 7 days, memory product being assigned a value of 10 days;
   assembly activities, being assigned a value of 7 days;
   final test activities, being assigned a value of 5 days;
   transfer activities, being assigned a value of 1 day; and
   shipping activities, being assigned a value of 1 day.

32. The system of claim 28, the means of determining a second step comprising means of implementing:
   if step 1 result date<Allo Month
   then committed date=the 15th of Allo Month
   else committed date=step 2 result date.

* * * * *